United States Patent [19]
Schweizer et al.

[11] Patent Number: 6,011,654
[45] Date of Patent: Jan. 4, 2000

[54] OPTICAL ARRANGEMENT FOR SEVERAL INDIVIDUAL BEAMS WITH A SEGMENTED MIRROR FIELD

[75] Inventors: Jürgen Schweizer, Westerhofen; Albrecht Geist, Aalen; Bruno Schweizer, Oberkochen, all of Germany

[73] Assignee: Carl-Zeiss-Stiftung, Germany

[21] Appl. No.: 08/921,970

[22] Filed: Sep. 2, 1997

[30] Foreign Application Priority Data

Sep. 4, 1996 [DE] Germany ............................ 196 35 800

[51] Int. Cl.[7] .............................. G02B 27/14; G02B 5/08
[52] U.S. Cl. ........................ 359/636; 359/629; 359/850; 359/862
[58] Field of Search ..................................... 359/618, 629, 359/633, 636, 637, 838, 850, 852, 855–858, 862, 865; 219/121.74, 121.76

[56] References Cited

U.S. PATENT DOCUMENTS

| | | | |
|---|---|---|---|
| 5,345,340 | 9/1994 | Goedert | 359/853 |
| 5,674,414 | 10/1997 | Schweizer | 219/121.77 |
| 5,676,866 | 10/1997 | in den Bäumen et al. | 219/121.77 |
| 5,796,526 | 8/1998 | Anderson | 359/618 |

*Primary Examiner*—Huy Mai

[57] ABSTRACT

An optical arrangement includes several separate individual beams that pass through a common focus before a first segmented mirror field and, after reflection by respective separate mirrors of the segmented mirror field, the individual beams are imaged by an objective on one or more workpieces. A second segmented mirror field is arranged between the first segmented mirror field and the object, or at least one beam splitter is arranged after the focus and deflects the individual beams onto at least one segmented mirror field, by which they are reflected back at least nearly identically on themselves.

14 Claims, 2 Drawing Sheets

OPTICAL ARRANGEMENT FOR SEVERAL INDIVIDUAL BEAMS WITH A SEGMENTED MIRROR FIELD

BACKGROUND OF THE INVENTION

Field of the Invention

The invention relates to an optical arrangement in which several separate individual beams pass through a common focus before a first segmented mirror field, and after reflection of the individual beams at a respective separate mirror of the segmented mirror field, are imaged on one or more workpieces by means of an objective.

When imaging many individual beams on a workpiece is desired, the image to be derived from the individual beams may be distorted. The mutual relationship of the individual beams may be distorted due to a solid angle distortion between the individual beams; or, with compulsory constant mutual solid angle spacing between the individual beams, different beam diameters at the objective or in the image plane arise due to the different path lengths of the individual beams at the objective or in the image plane.

The Offner system presents a solution to this problem that is technically very expensive.

SUMMARY OF THE INVENTION

The object of the present invention is to provide an optical arrangement for imaging many individual beams, in which the length of each individual beam, from an outgoing focus point as far as an objective pupil point, can be made as constant as possible, and the mutual geometric spatial arrangement of the individual beams remains as mutually exact as possible.

This object is attained by a first segmented mirror field, a second segmented mirror field, and an objective, in which several separate individual beams pass through a common focus arranged before the first segmented mirror field and after reflection of the separate individual beams by respective separate mirrors of the first segmented mirror field the individual beams are imaged by the objective on at least one workpiece. The second segmented mirror field is arranged between the first segmented mirror field and the objective.

The object of the invention is also attained in a second embodiment having a first segmented mirror field, an objective, and at least one beam splitter, in which the first segmented mirror field has several separate movable mirrors. Several separate individual beams pass through a common focus before the first segmented mirror field and after reflection of the individual beams by respective mirrors of the first segmented mirror field, the individual beams are imaged by the objective on at least one workpiece. At least one beam splitter is arranged after the focus (3). From the beam splitter, the individual beams fall on the first segmented mirror field and are reflected back by the first segmented mirror field at least nearly identically on themselves and pass through the beam splitter to the objective.

The invention provides two ways to match the lengths of the optical paths of the individual beams to each other.

In both embodiments of the invention described herein, an outgoing beam bundle of a focused multiple beam corresponding to, e.g., a square pyramid, is deflected to a segmented mirror field, such that each individual beam is reflected on a respective mirror of the segmented mirror field and from there, in the basic position of the mirror, into the pupil point of an objective, such that:

the length of each individual beam from the outgoing focus point up to the objective pupil point is as constant as possible, and the geometric mutual spatial arrangement of the individual beams is also as constant as possible, or remains as mutually proportional as possible.

In one optical arrangement according to the invention at least one beam splitter is arranged after the focus and deflects the individual beams onto at least one segmented mirror field, from which they are reflected back onto themselves as nearly identically as possible.

This is the most elegant solution to the problem of distortion, but results in a high energy loss of at least 75%. In order to raise the energy yield to a maximum of 50%, a second segmented mirror array is required. The individual mirror movements of the second segmented mirror array must be coupled exactly to the individual mirror movements of the first segmented mirror array.

In a second optical arrangement according to the invention, a second segmented mirror field is arranged between the first segmented mirror field and the objective.

In this second arrangement, the outgoing beam pyramid is deflected onto a stationary segmented mirror array by which a reflection of all the individual beams takes place. Advantageously, the stationary segmented mirror array is adjustable for mounting, in order to compensate for production tolerances. Advantageously, the individual beams run parallel from the first to the second array, and the second segmented mirror array is constructed of computer controlled two-axis tilting mirrors that reflect the individual beams at angles close to 90 degrees into the direction of the objective pupil.

Depending on the size of the individual reflecting mirrors, the "height" of the parallel beam bundle (z-axis height difference of the individual beams on reflection at the first segmented mirror array) can be considered to be the "diameter of the bundle as a whole", and can be freely established such that the individual mirrors of the segmented mirror array do not obstruct each other. At a predetermined aperture angle $\Phi$ of the beam bundle after the focus following the first lens, the dimensioning of the arrangement then only depends on the "base height h" (preferably, the perpendicular distance of the middle mirror in the segmented mirror array to the focus following the first lens (11 in FIG. 2)), when the middle beam of the beam bundle is reflected at right angles towards the second segmented mirror array, and the individual beams run mutually parallel between the two segmented mirror arrays.

The total length of the individual beams can be made exactly equal when the mirrors of the second segmented mirror array are in the basic position, and all the individual beams, after their reflection at the second segmented mirror array, pass through a common focus, and the spatial mutual geometrical arrangement of the individual beams is not troublesomely distorted (wherein they can be equal, or have a proportionately smaller or larger aperture angle). Thus the telecentric focusing of the individual beams can be carried out optimally (i.e., with minimum optical distortions, and aberrations, and with the same image plane of the individual beams focused by the objective), with minimum energy loss.

The great advantage of this solution is that equal lengths can be made at equal solid angles. Care is to be taken here that the distance between the individual mirrors of the segmented mirror array is large enough for all the tilting mirrors in the second segmented mirror array to have sufficient room available to them. This is achieved by the use of a second segmented mirror array, in which the diameter of the individual beams, with non-parallel envelopes of the individual beams, is of a different size on the first and second segmented mirror arrays, respectively. The angle of incidence of the individual beams on the individual mirrors also contributes to the size of the diameter of the individual mirrors of the segmented mirror arrays.

In the first optical arrangement according to the invention, a right-angle beam splitter is advantageously arranged after the focus, and deflects the individual beams onto two segmented mirror fields from which they are reflected back nearly identically onto themselves; and the mirror fields are advantageously arranged at a right angle to each other.

Constructing the first mirror field from individual movable mirrors facilitates their mounting in an advantageous manner. The movements of the individual mirrors can take place in the direction of the individual incident beams, and/or perpendicularly to the individual incident beams.

When the second mirror field is constructed of movable individual mirrors, it is possible to work on the workpiece surface, not only at a given point, but also, by the tilting movement of the mirror in a certain, defined region of movement, the beam can either be placed at another location, or can execute, nearly telecentrically, an optional movement in a limited region on the workpiece surface.

If the individual beams run parallel between the two mirror fields, this facilitates the design of the whole system and makes it possible to position the individual mirrors in the segmented mirror array by a simple mathematical calculation.

If the first mirror field is designed as a stationary segmented mirror array, the first segmented mirror array can be produced as a monolithic block, thereby drastically reducing the production costs.

If on the other hand the first mirror field is designed as an adjustable segmented mirror array, this considerably simplifies the mounting of the whole system. According to the design and the field of application of the optical arrangement, sometimes the one and sometimes the other variant can be advantageous, particularly from the standpoint of the required optical quality of the individual beams.

In each case, it is advantageous if the second mirror field is constructed from computer controlled two-axis tilting mirrors. This facilitates the use of the optical arrangement, not only for pointwise projection of the beams on the surface of a workpiece which then has to be moved for further processing, but also makes possible the point illumination by a beam at quite varied places of a multidimensional working field on the workpiece and also the production of linear exposures.

The exposures can serve to produce erosions on the workpiece, or else to apply irradiation only at certain places around the workpiece (for heating, exposure of photosensitive layers, etc.).

The invention can in particular be used in optical arrangements as described in U.S. patent application Ser. No. 08/422,577 filed Apr. 14, 1995 with priority of DE 44 23 040, U.S. patent application Ser. No. 08/422,575 filed Apr. 14, 1995 with priority of DE 44 40 117. All of the data given in these patents can be used with the optical arrangement according to the invention.

The wavelength and the properties of the individual beams are chosen to meet the requirements for the use of the optical arrangement (e.g., exposure of a photographic layer, erosion of material, etc.).

BRIEF DESCRIPTION OF THE DRAWINGS

Preferred embodiments of the invention will now be described, taken together with the accompanying drawings, in which.

DETAILED DESCRIPTION OF PREFERRED EMBODIMENTS

Figure 1:
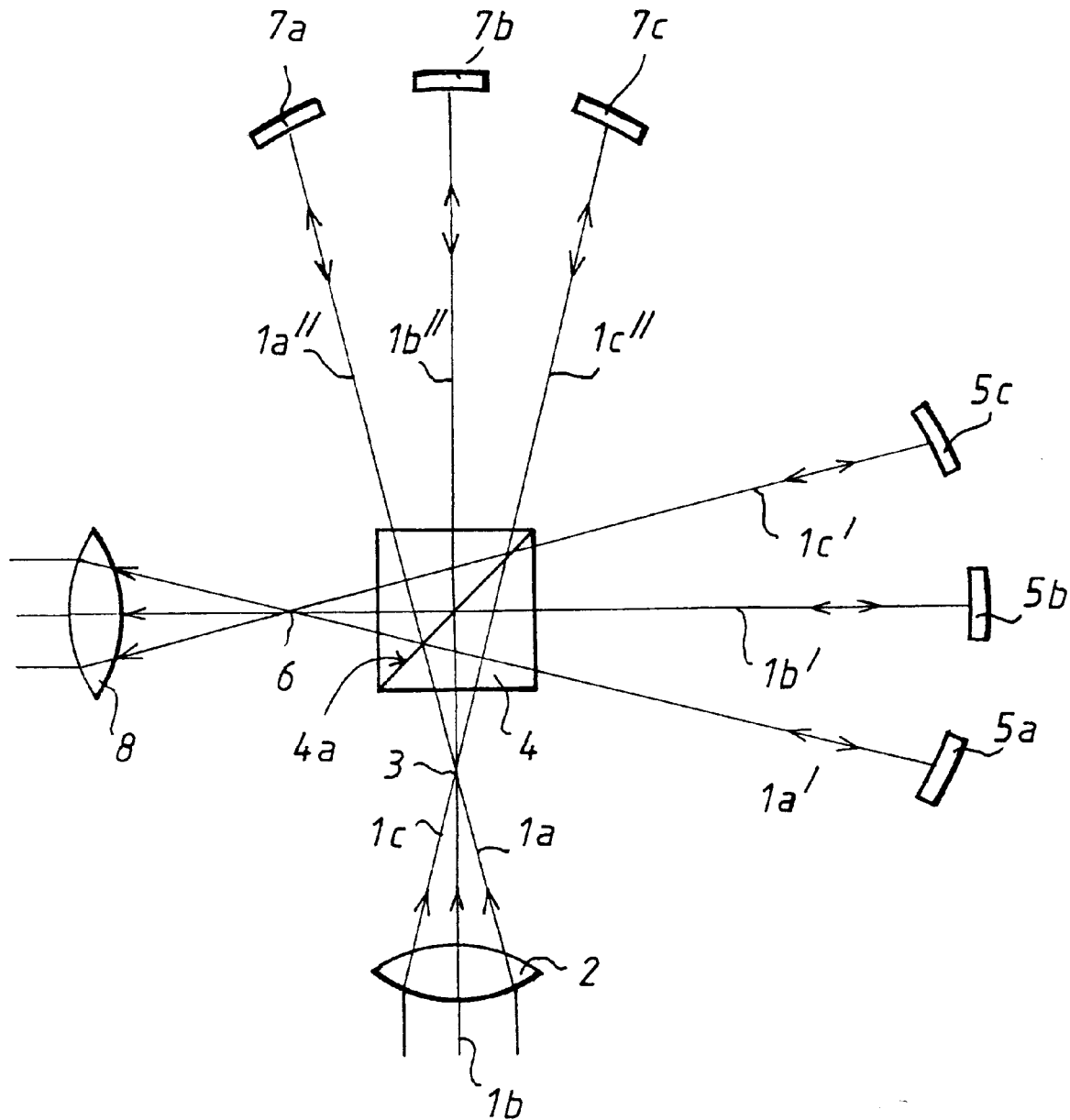
FIG. 1 shows a first embodiment of the inventive concept according to the invention.

A first embodiment according to the invention is shown in FIG. 1. Individual beams (1a, 1b, 1c) produced according to the state of the art, after being focused by a lens (2) to have a common focus (3) fall on a beam splitter (4), which divides the bundle of beams (1a, 1b, 1c) incident on its beam splitter layer (4a) into two identical bundles of beams (1a', 1b', 1c'; 1a", 1b", 1c").

The individual beams (1a', 1b', 1c'; 1a", 1b", 1c") are deflected following the beam splitter (4) to at least one segmented mirror array (5a, 5b, 5c), which can deflect the individual beams (1a', 1b', 1c') through a small beam angle. The segmented mirror array (5a, 5b, 5c) consists of a plurality of discrete movable single mirrors. The individual beams (1a', 1b', 1c') are thereby reflected back at least nearly onto themselves, so that the optical path of the individual beams (1a, 1b, 1c) is identical up to a second "quasi-focus point" (6), i.e., the point of intersection of the individual beams in the basic position of the mirror array behind the beam splitter (4). The individual beams pass through this second focus point (6) in the basic position of the segmented mirror array (5a, 5b, 5c).

The problem of distortion does not arise here, since we are essentially concerned with right angles and hardly any length differences occur in the optical paths. The energy loss is however very large. From the original 100% of the incoming energy of the single beams (1a, 1b, 1c) only a maximum of 25% of the energy leaves the beam splitter cube (4) in the direction of the second focus point (6).

The energy loss can be limited to at least about 50% by setting up a second segmented mirror array (7a, 7b, 7c) in the second beam path of the individual beams (1a", 1b", 1c").

In the case of a motion of the individual beams on one or more workpiece surfaces beyond the lens (8), a fixed coupling between the two segmented mirror arrays (5a, 5b, 5c, 7a, 7b, 7c) must then take place, in which both must have the same mobility (the same tilt angle) in the same axis or axes.

Figure 2:
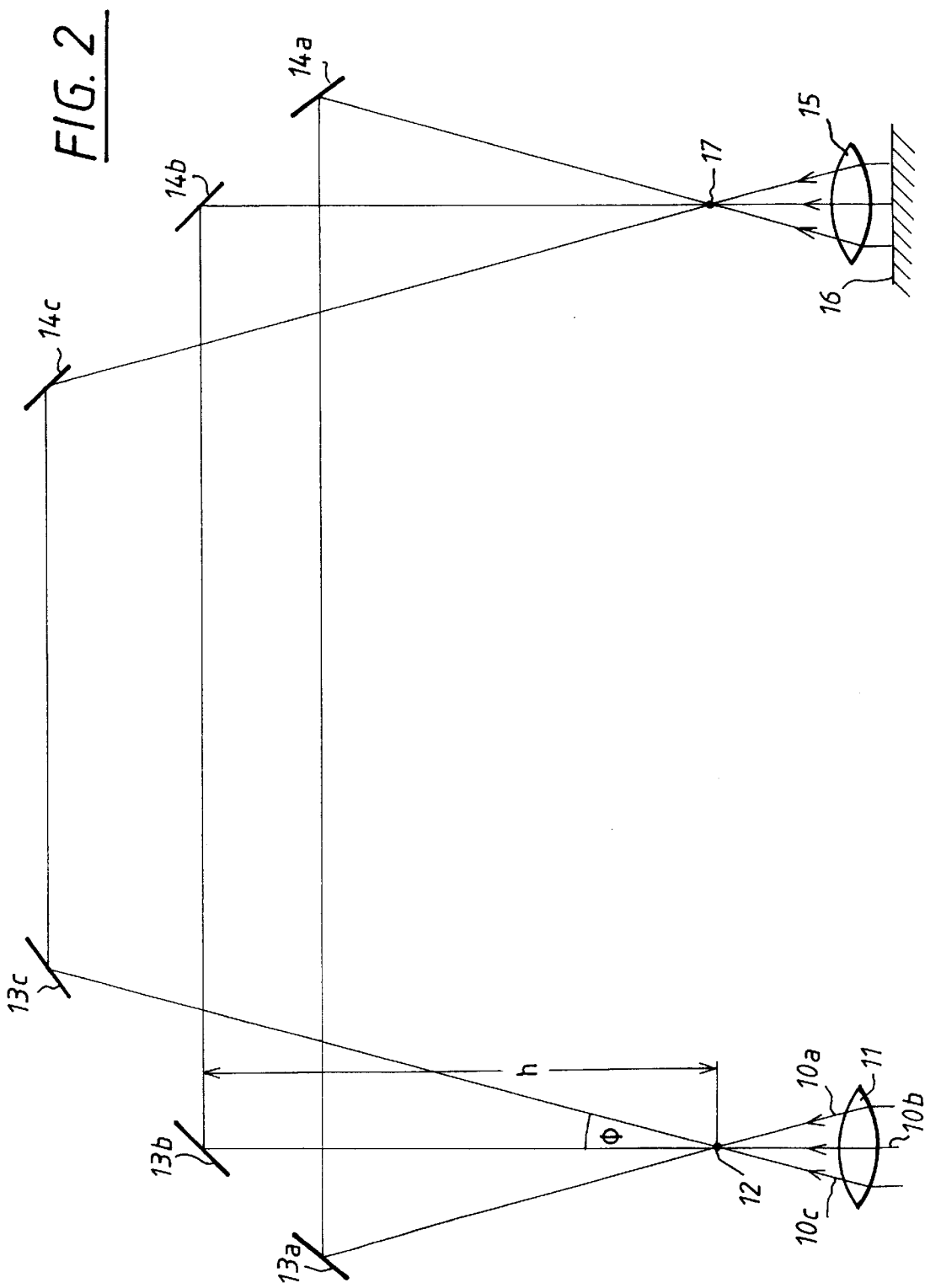
FIG. 2 shows a second embodiment of the inventive concept according to the invention.

The second arrangement according to the invention is shown in FIG. 2. Here, the separate, spatially mutually separated individual beams (10a, 10b, 10c) that run parallel to each other and which have previously been produced according to the state of the art, are first focused by a first lens (11).

A first segmented mirror array (13a, 13b, 13c) is arranged behind the common focus (12) of the individual beams (10a, 10b, 10c), and deflects the individual beams (10a, 10b, 10c) to a second segmented mirror array (14a, 14b, 14c) (preferably at angles close to 90°).

While the individual mirrors of the first segmented mirror array (13a, 13b, 13c) need not be displaced after adjustment and can therefore be rigid, the second segmented mirror array (14a, 14b, 14c) is constructed of tilting mirrors that can be tilted in at least one axis, better however in two axes which are mutually orthogonal.

In that the mirrors (13a, 14a; 13b, 14b; 13c, 14c) which are respectively used correctly position the individual beams (10a, 10b, 10c) relatively to each other (which already occurs in an appropriate manner, due to the design of the equipment), the optical paths of the individual beams (10a, 10b, 10c) can be matched to each other, and the optical path of the individual beams (10a, 10b, 10c) can always be given the same length.

For positioning the first segmented mirror array (13a, 13b, 13c), a z-axis displacement combined with an at least single-axis tilt axis displacement is appropriate, although the first segmented mirror array (13a, 13b, 13c) could also consist of a monolithic block. The individual mirrors of the segmented mirror array (13a, 13b, 13c) can however also be constructed identical to those of the second segmented mirror array (14a, 14b, 14c) and consist of single-axis or multi-axis tilting mirrors.

If the first segmented mirror array (13a, 13b, 13c) is constructed corresponding to the design of the second segmented mirror array (14a, 14b, 14c), however, the possibility of positioning the individual mirrors in the first segmented mirror array (13a, 13b, 13c) can be completely dispensed with, and this array can be built as rigid mirrors which remain in a fixed mutual positional relationship. The first segmented mirror array (13a, 13b, 13c) then can consist of a single, monolithic block, in which the individual mirror regions are incorporated in the required positions.

A lens (15) (preferably a $f_\theta$ objective or a telecentric projection lens) is mounted behind the second segmented mirror array (14a, 14b, 14c), and images the beams on the surface of at least one workpiece.

In front of the lens (15), which can also symbolically represent a lens group, the beams (10a, 10b, 10c) pass, in the basic position of the tilting mirrors of the second segmented mirror array, through a further common intersection point (17) (pupil for the objective 15). It is now important for the imaging quality of the individual beams (10a, 10b, 10c) on the workpiece surface (16) (working field of the individual beams) that the length of the individual beams between the first focus (12) and this second focus is as far as possible exactly the same. Only then is an error-free beam control of the individual beams (10a, 10b, 10c) possible, and the small deflections of the individual beams (10a, 10b, 10c) by the tilting mirrors (14a, 14b, 14c) of the second segmented mirror array do not lead to displacement of the individual beams (10a, 10b, 10c) in position and focus, which cannot be tolerated.

The invention can of course also be embodied in optical arrangements which appear different. Thus, in particular, the number of reflections between the two focus points (12, 17) can be higher, and the lenses (11, 15) can also be constituted by lens groups with an optional number of lenses.

We claim:

1. An optical arrangement, comprising:
    a first segmented mirror field (13a, 13b, 13c),
    a second segmented mirror field (14a, 14b, 14c), and
    an objective lens (15), wherein:
    several separate individual beams (10a, 10b, 10c) pass through a common focus (12) before said first segmented mirror field (13a, 13b, 13c) and after reflection of said individual beams (10a, 10b, 10c) by respective separate mirrors of said first segmented mirror field (13a, 13b, 13c) said individual beams pass to respective separate mirrors of said second segmented mirror field (14a, 14b, 14c) and are reflected by said separate mirrors of said second mirror field (14a, 14b, 14c) to said objective lens (15) and are imaged by said objective lens (15) on at least one workpiece (16).

2. The optical arrangement according to claim 1, wherein said first mirror field comprises several separate movable mirrors.

3. The optical arrangement according to claim 1, wherein said second mirror field (14a, 4b, 14c) comprises several separate movable mirrors.

4. The optical arrangement according to claim 1, wherein said individual beams (10a, 10b, 10c) are arranged to run parallel between said first segmented mirror field (13a, 13b, 13c) and said second mirror field (14a, 14b, 14c).

5. The optical arrangement according to claim 1, wherein said first segmented mirror field (13a, 13b, 13c) comprises a stationary segmented mirror array.

6. The optical arrangement according to claim 1, wherein said first segmented mirror field (13a, 13b, 13c) comprises an adjustable segmented mirror array.

7. The optical arrangement according to claim 1, wherein said second segmented mirror field (14a, 14b, 14c) comprises several computer controlled two-axis tilting mirrors.

8. An optical arrangement, comprising:
    a first segmented mirror field (5a, 5b, 5c),
    an objective lens (8), and
    at least one beam splitter (4), wherein:
    said first segmented mirror field (5a, 5b, 5c) comprises several separate movable mirrors,
    several separate individual beams (1a, 1b, 1c) pass through a common focus (3) before said first segmented mirror field (5a, 5b, 5c),
    each of said individual beams (1a, 1b, 1c) is reflected by a respective separate moveable mirror of said first segmented mirror field (5a, 5b, 5c) and after reflection, each of said individual beams (1a', 1b', 1c') is imaged by said objective lens (8) on at least one workpiece, and
    said at least one beam splitter (4) is arranged after said common focus (3), from which beam splitter (4) each of said individual beams (1a', 1b', 1c') falls on respective separate movable mirrors of said first segmented mirror field (5a, 5b, 5c), and are reflected back by said movable mirrors of said first segmented mirror field (5a, 5b, 5c) at least nearly identically on themselves and pass through said beam splitter (4) to said objective lens (8).

9. The optical arrangement according to claim 8, further comprising a second segmented mirror field (7a, 7b, 7c) arranged at a right angle to said first segmented mirror field (5a, 5b, 5c), wherein:
    said at least one beam splitter (4) comprises a right angle beam splitter (4) and deflects said individual beams (1a' 1b', 1c', 1a", 1b", 1c") onto said two first and second segmented mirror fields which reflect said individual beams (1a', 1b', 1c', 1a", 1b", 1c") back at least nearly identically on themselves.

10. The optical arrangement according to claim 8, wherein said first segmented mirror field comprises several separately movable mirrors.

11. The optical arrangements according to claim 8, further comprising a second segmented mirror field, wherein said second segmented mirror field (14a, 4b, 14c) comprises several separately movable mirrors.

12. An optical arrangement, comprising:
    a first segmented mirror field (5a, 5b, 5c)
    a second segmented mirror field (7a, 7b, 7c) arranged at a right angle to said first segmented mirror field (5a, 5b, 5c),
    an objective lens (8), and
    at least one beam splitter (4), wherein:
    said first segmented mirror field (5a, 5b, 5c) comprises several separate movable mirrors,
    several separate individual beams (1a, 1b, 1c) pass through a common focus (3) before said first segmented mirror field (5a, 5b, 5c) and after reflection of said individual beams (1a', 1b', 1c') by respective mirrors of said first segmented mirror field (5a, 5b, 5c) are imaged by said objective lens (8) on at least one workpiece, said at least one beam splitter (4) is arranged after said common focus (3), from which beam splitter (4) said individual beams (1a', 1b', 1c') fall on said first segmented mirror field (5a, 5b, 5c) and are reflected back by said first segmented mirror field (5a, 5b, 5c) at least nearly identically on themselves and pass through said beam splitter (4) to said objective lens (8), and said at least one beam splitter (4) comprises a right angle beam splitter (4) that pass said individual beams (1a', 1b', 1c', 1a", 1b", 1c") to said first and second segmented mirror fields, which reflect said individual beams (1a', 1b', 1c', 1a", 1b", 1c") back at least nearly identically on themselves.

13. The optical arrangement according to claim 12, wherein said first segmented mirror field comprises several separately movable mirrors.

14. The optical arrangement according to claim 12, wherein said second segmented mirror field comprises several separately movable mirrors.

* * * * *